Dec. 11, 1928.
R. TRAFELET
1,694,495
MACHINE FOR ROLLING SHEET METAL
Filed Sept. 5, 1922
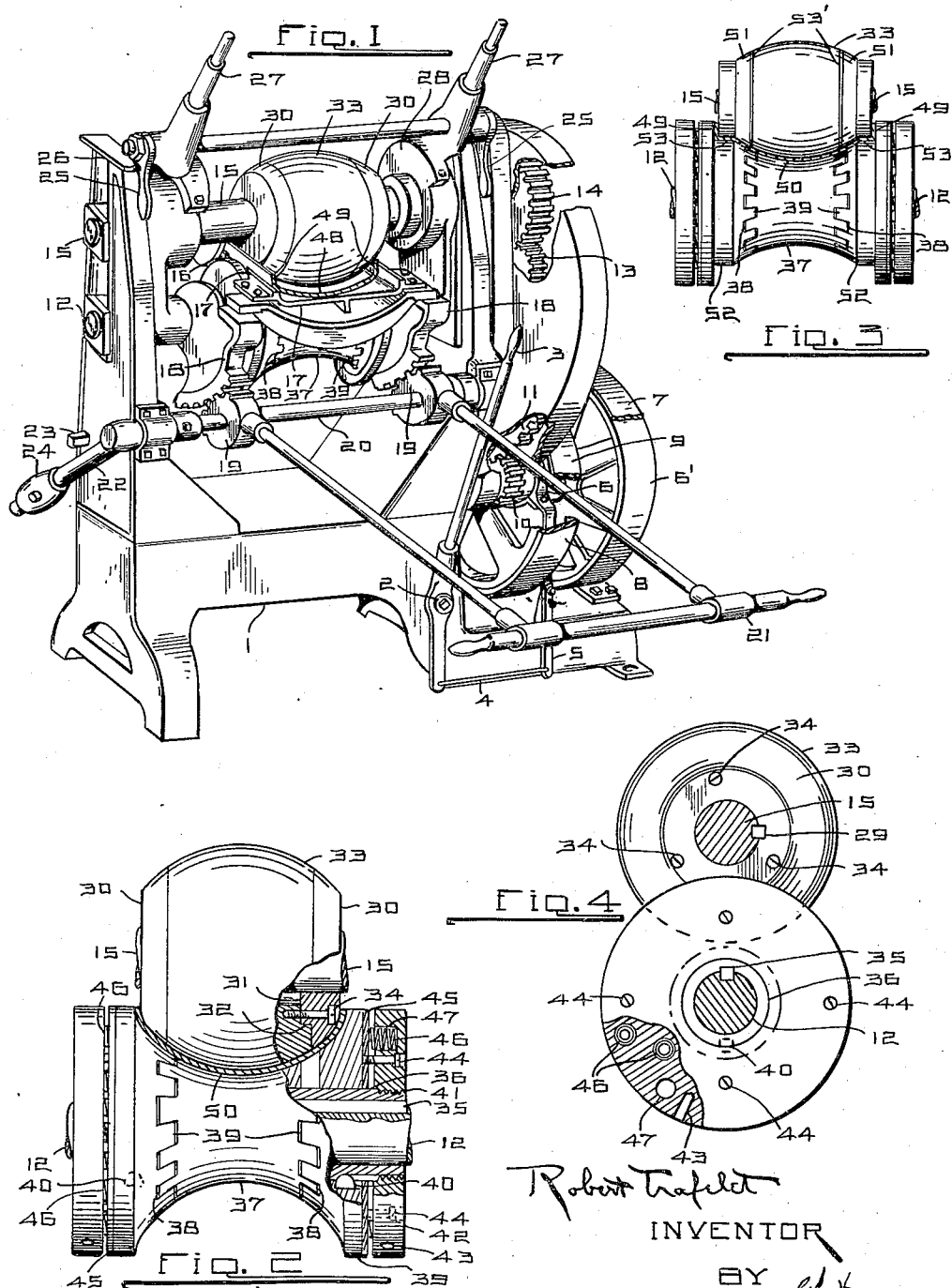
Robert Trafelet
INVENTOR
BY
ATTORNEY Patented Dec. 11, 1928.

1,694,495

UNITED STATES PATENT OFFICE.

ROBERT TRAFELET, OF FOSTORIA, OHIO, ASSIGNOR, BY DIRECT AND MESNE ASSIGNMENTS, TO THE YODER COMPANY, OF CLEVELAND, OHIO, A CORPORATION OF OHIO.

MACHINE FOR ROLLING SHEET METAL.

Application filed September 5, 1922. Serial No. 586,177.

This invention relates to a machine for working sheet metal to form.

This invention has utility when incorporated in a machine for giving the two direction shapes in rolling to form fenders for motor vehicle wheels.

Referring to the drawings:

Figure 1 is a perspective view of a rolling machine embodying the invention herein disclosed;

Fig. 2 is a detail view, with parts broken away, of the pair of live working rolls;

Fig. 3 is a detail view of the working rolls for second stage operation; and

Fig. 4 is an end elevation of the working rolls, parts being broken away.

1 indicates a machine frame shown as carrying fulcrum pin 2 for clutch lever 3 connected by link 4 to rock arm 5 in throwing clutch 6 from medial disconnected position, to driving position in one direction when connected to the pulley 6' as driven by the belt 7. For reverse direction driving, the clutch 6 is thrown into engagement with pulley 8 driven by the belt 9 in an opposite direction from the pulley 6'.

Driving from the pulley 6' or the pulley 8 is effective through pinion 10 to actuate gear 11 as a speed reduction drive for shaft 12 in the frame 1. Fast with the shaft 12 is gear 13, adjacent the gear 11. This gear 13 is in mesh with similar gear 14 on shaft 15 parallel to the shaft 12. The sheet metal stock to be worked by passing and repassing may be guided to the machine by fixed guide 16 to pass through the working rolls to guide 17 carried by arms 18 having segments in mesh with segments 19 on rock shaft 20 carried by the frame 1 parallel to and below the shaft 12. By forcing handle 21 downward the guide 17 may be lifted to impart wheel radius curve to a fender being formed. The limit of this curvature may be determined by arm 22 coming against stop 23 on the frame 1. This arm 22, fast with the shaft 20 has an adjustable counterweight 24 for balancing the arm 21.

By releasing dogs 25 from top plates 26, handles 27 may be rocked to shift eccentrics 28 for moving the shaft 15 away from the shaft 12, for access to the working rolls.

Fixed on the shaft 15 by keys 29 are end disks 30 having opposing centering projecting rings 31 for entering seats 32, and thereby carrying intermediate convex working roll section 33. These three sections 30, 33, 30, are held together in assembled relation by bolts 34.

Coacting with convex roll 30, 33, 30, is a concave roll mounted on the shaft 12 in the following manner: 36 is a sleeve fixed to the shaft 12 by a key 35 and arranged to support the intermediate section indicated at 37, of the concave roll. The opposite ends of the roll section are dove-tailed, as shown at 38, these ends interfitting with dove-tailed terminal sections 39. These roll sections 39, 37, 39, are preferably splined on the sleeve 36 by Wadsworth keys 40. On threaded ends 41 of the sleeve 36 are disks 42, which may be run up to the adjusted positions on the sleeve by engaging a tool in the recesses 43. Bolts 44 countersunk and loose with the disks 42 extend therethrough toward the terminal roll sections 39, to engage plates 45, secured in any well known way to the outer faces of the sections 39. 46 indicates coiled springs mounted in pockets 47 formed in the inner faces of the disks 42 and normally engaging the sections 39 to move them inwardly or toward the section 37, to the extent permitted by the heads of the bolts 44 engaging the disks 42; whereas the latter disks determine the maximum spread of the sections 39. By adjustment of the bolts 44 the movement of the sections 39 under the influence of the springs 46 may be increased or decreased. The range of yielding is thus determined by the bolts 44, while the maximum width for the roll is determined by the adjustment of the disks 42 on the sleeve 36. The dovetailed portions, due to their interfitting, not only additionally key the sections 39, 37, 39, for common angular travel, but maintain continuity for uninterrupted working surfaces upon the stock. The strong spring action of the terminal sections 39 upon the bent up or skirt edges of a crown fender, hold such marginal offset portions for smooth forming. There is thus effective ironing out of wrinkles, or rather action precluding even initial forming of such.

As there may be wear upon the greater duty terminal sections 30, such wear may be taken up by keeping the faces between the sections machined, and inserting shims for the desired wear take-up.

For niceties of adjustment, or for taking care of gage variations from that originally designed, the dove-tailed interfitting tongues may have their free ends machined off. There is accordingly in the disclosure a wide range for all adjustments which may be readily cared for directly on the rolling machine, and directly upon the rolls, without the interposition of any special or cumbersome apparatus, or any danger of anything letting go to cause injury.

The detachable or readily replaceable terminal sections for the working rolls permit a greatly increased range in character of output. A regular crown fender 48 may have skirt or marginal flanges 49 thereon, say to be terminally beaded and wired. However, in the formation of a continuous crown 50 (Fig. 2), such may be the first stage, and with substitution of terminal sections 51, 52, respectively, for the terminal sections 30, 37, (see Fig. 3) offsets 53 may be formed from the medial crown portion 50, which offsets 53 are adjacent skirts or marginal flanges 49. This sequence of rolling or working of the initial flat sheet metal stock, back and forth through the machine, by reversing the clutch 6, and simultaneously taking care of the wheel radius arc in controlling the handle 21, permits of high grade smooth clean product turned out with rapidity. On the convex live roll there may be disposed between the medial section 33 and the terminal sections 51, shims 53' to take care of wear.

To those skilled in the art to which my invention relates many changes in construction and widely differing embodiments and applications of my invention will suggest themselves without departing from the spirit and scope thereof. My disclosures and the description herein are purely illustrative and are not intended to be in any sense limiting.

What is claimed and it is desired to secure by Letters Patent is:

1. A rolling machine embodying a pair of opposing live working rolls for passing sheet metal therebetween, one of said rolls being convex and the other concave and each being in three sections, the sections of said concave roll being relatively movable on the axis thereof during the passing of a sheet between said rolls.

2. In a machine of the class described, the combination of a shaft, a concave roll comprising an intermediate section and outer side sections movable relative to said intermediate section, relatively stationary devices disposed adjacent the outer sides of said outer sections, and expansion means interposed between each said device and the adjacent roll section normally tending to move it toward said intermediate section.

3. A rolling machine embodying a pair of opposing live working rolls for passing sheet metal therebetween, one being convex and the other concave, said concave roll having independent terminal sections provided with peripheral cheeks opposing the opposite ends of said convex roll and movable relative to the intermediate section along the axis of said concave roll.

4. In a machine of the character described, the combination of a pair of working rolls for passing sheet metal in the forming thereof, one of said rolls being relatively fixed and the other roll embodying an intermediate relatively fixed section and a pair of outer relatively yieldable terminal sections.

5. A sheet metal rolling machine embodying a convex working roll including an intermediate section and a pair of terminal sections, and a second roll having outomatically independently movable shaping cheeks opposing the convex roll terminal sections.

6. A sheet metal rolling machine embodying a concave working roll comprising a plurality of sections having longitudinally interfitting elements arranged to maintain substantial peripheral continuity of the rolls, and means tending to yieldingly maintain said sections in assembled relationship.

7. A sheet metal rolling machine consisting of a pair of related complementary spaced rollers between which a section of said metal may be passed to effect shaping thereof, one of said rollers embodying a working roll comprising sections having dove-tailed joints between them, means tending to yieldingly maintain said sections together, and means for driving one of said rollers.

8. A sheet metal rolling machine including a shaft and a working roll mounted on said shaft, said roll comprising an inner section and outer sections at the opposite ends thereof, devices adjustably engaging said shaft at opposite ends of said roll, and a spring between each said device and the adjacent outer section tending to move the latter toward the inner section of said roll.

In witness whereof I affix my signature.

ROBERT TRAFELET.